United States Patent [19]
Westberg

[11] Patent Number: 6,041,054
[45] Date of Patent: Mar. 21, 2000

[54] EFFICIENT TRANSPORT OF INTERNET PROTOCOL PACKETS USING ASYNCHRONOUS TRANSFER MODE ADAPTATION LAYER TWO

[75] Inventor: Lars Westberg, Enköping, Sweden

[73] Assignee: Telefonaktiebolaget LM Ericsson, Stockholm, Sweden

[21] Appl. No.: 08/936,116

[22] Filed: Sep. 24, 1997

[51] Int. Cl.[7] .................................................. H04Q 11/04
[52] U.S. Cl. ......................... 370/389; 370/465; 370/466; 370/474; 370/477
[58] Field of Search .................................. 370/389, 392, 370/395, 409, 465, 466, 473, 474, 477, 401

[56] References Cited

U.S. PATENT DOCUMENTS

| 5,293,379 | 3/1994 | Carr . | |
|---|---|---|---|
| 5,440,551 | 8/1995 | Suzuki | 370/473 |
| 5,673,263 | 9/1997 | Basso et al. | 370/401 |
| 5,742,599 | 4/1998 | Lin et al. | 370/395 |
| 5,822,321 | 10/1998 | Petersen et al. | 370/474 |

OTHER PUBLICATIONS

Draft New ITU–T Recommendation I.363.2 "B–ISDN ATM Adaptation Layer Type 2 Specification", Seoul, Feb. 1997, pp. 1–29.
Draft New ITU–T Recommendation I.seg "Segmentation and Reassembly Service Specific Convergence Sublayer for the AAL Type 2", Toronto, Sep. 1997, pp. 1–33.
W. Simpson, "Point–to–Point Protocol (PPP)", Daydreamer, Network Working Group, RFC 1549, Dec. 1993, pp. 1–53.
W. Simpson, "PPP in HDLC Framing", Daydreamer, Network Working Group, RFC 1549, Dec. 1993, pp. 1–18.
V, Jacobson, "Compressing TCP/IP Headers for Low–Speed Serial Links", LBL, Network Working Group, RFC 114, Feb. 1990, pp. 1–43.
S. Casner et al., "Compressing IP/UDR/RTP Headers for Low–Speed Serial Links", LBNL, Internet Engineering Task Force, Nov. 1997, pp. 1–22.
Armitage et al., "How Inefficient is IP Over ATM Anyway", 8302 IEEE Network, vol. 9. No. 1, Jan. 1, 1995, pp. 18–26.
Bredeson et al., "Efficiency of ATM Networks in Transporting TCP/IP Traffic", Proceedings of the Twenty–Eight Southeastern Symposium on System Theory, Baton Rouge, LA, Mar. 31–Apr. 2, 1996, pp. 40–44.
Baldwin et al., "AAL–2—A New ATM Adaption Layer for Small Packet Encapsulation and Multiplexing" Bell Labs Technical Journal, vol. 2, No. 2, Mar. 21, 1997, pp. 111–131.

*Primary Examiner*—Chi H. Pham
*Assistant Examiner*—Frank Duong
*Attorney, Agent, or Firm*—Burns, Doane, Swecker & Mathis, L.L.P.

[57] ABSTRACT

The bandwidth utilization and transmission efficiency associated with the point-to-point transportation of internet protocol (IP) data packets in a network environment is improved by employing asynchronous transfer mode (ATM) adaption layer two (AAL2) minicells as a bearer. Bandwidth utilization and transmission efficiency may be further enhanced by mapping one or more data fields from the header portion of the IP data packets into one or more look-up tables and then transporting the look-up table addresses in the AAL2 minicell headers rather than the data associated with the one or more data fields in the IP data packet headers.

20 Claims, 10 Drawing Sheets

EFFICIENT TRANSPORT OF INTERNET PROTOCOL PACKETS USING ASYNCHRONOUS TRANSFER MODE ADAPTATION LAYER TWO

BACKGROUND

The present invention relates to asynchronous transfer mode (ATM) and the transportation of internet protocol (IP) data packets over a single ATM connection. More particularly, the present invention employs ATM adaption layer two (AAL2) and header compression techniques to more efficiently transport multi-protocol internet data over a single ATM connection in a network environment.

ATM is a standard protocol for transmitting asynchronous telecommunication data. This protocol is based on the transmission of data in fixed size data packets known as ATM cells. Each ATM cell exhibits a singular format comprising a 48 octet payload portion and a 5 octet header portion. ATM is well known in the art.

Unfortunately, ATM does not efficiently transport low bit rate data. The reason being, the length of a typical low bit rate data packet is significantly less than 48 octets (i.e., the length of an ATM cell payload). Any unused portion of an ATM cell payload is filled with "padding bits". When padding bits are inserted rather than data, bandwidth is wasted. It will be understood that inserting padding bits may also result in unacceptable transmission delays, which may be detrimental, especially when the data being transported is highly sensitive to delays, such as voice-type data.

Recently, an ATM adaption layer known as AAL2 has been developed. AAL2 was specifically for the purpose of improving the efficiency of ATM when employed to transport low bit data. Referring to FIG. 2, AAL2 operates by storing low bit rate data in small, variable length data packets called minicells (sometimes referred to as microcells or short packets), for example, minicell 205. Improved bandwidth utilization is achieved by inserting several minicells into the payload of a single ATM cell, such as ATM cell 210. To further improve bandwidth utilization, a minicell, for example minicell 215, may be segmented so that it overlaps two ATM cells as illustrated., FIG. 3 illustrates a well known protocol for an AAL2 minicell 301. The minicell 301 is divided into a 3 byte header 302 and a payload 303. The header is, in general, divided into the following fields: a circuit (channel) identifier (CID) 304, a length code 305, a cyclic redundancy code (CRC) code 306, and a user-to-user information (UUI) field 307. The CID 304 provides the information necessary to associate each minicell with a corresponding channel when multiplexing several channels. The length code 305 provides the information needed to determine the location of the first and last octet of each minicell. The CRC 306 provides an integrity check for the minicell header 301, and the UUI field 307 is used in conjunction with the minicell segmentation process.

It is well known in the art that ATM is commonly employed as a bearer for transporting data from point to point in a network environment. Typically, the data packets being transported are initially formatted in accordance with any one of a number of different internet protocols (IPs). Examples of such IPs include the transport control protocol (TCP), the user datagram protocol (UDP) and the real-time transport protocol (RTP).

Conventionally, these IP data packets are further formatted in accordance with a point-to-point protocol (PPP) The primary purpose for using the PPP is that PPP provides a standard format for multi-protocol data packets over point-to-point links. The PPP accomplishes this by encapsulating the different IP data packet types as illustrated in FIG. 4.

The encapsulation model 400 illustrated in FIG. 4 includes several data fields. The PPP protocol ID field 405 is generally 2 octets in length and it identifies the type of IP data packet appearing in the information field 410. For example, the PPP protocol ID field 405 may identify the IP data packet (not shown) as a RTP data packet, a UDP data packet or a TCP data packet. In addition. the PPP protocol ID field 405 establishes whether the header associated with the IP data packet is compressed or uncompressed. The encapsulation model 400 may also include a number of padding bits 415.

FIG. 5 illustrates a typical IP/PPP data packet header 500, more particularly, a TCP data packet header. To improve bandwidth utilization, and transmission efficiency, it is routine practice to compress the IP/PPP data packet header, as is well known in the art. Header compression is based on the fact that a significant number of the data fields in an IP/PPP header, for example IP/PPP data packet header 500, remain constant over the life of the session or connection. For example, FIG. 6 illustrates the data fields in the IP/PPP data packet header 500 that remain constant. Accordingly, a full header may be transmitted when the session/connection is first established. By transmitting a full header first, the decompressor can be configured to accommodate compressed headers during the remainder of the session/connection. Thereafter, only those fields that change need be transported. In fact, it is possible to further compress IP/PPP data packet headers even further by taking advantage of those fields that change periodically or that change by a constant value, as is well understood in the art. The specific data fields which remain constant, change periodically, or change by a constant value, depend on the IP/PPP data packet type.

Frequently, networks service more than one type of application, wherein each application produces data that exhibits a unique data transfer format. In order to employ ATM, each of the different data transfer formats must be reformatted (i.e., adapted) to conform to the ATM format. This is accomplished by one of several ATM adaption layers (AALs), for example AAL 101 illustrated in FIG. 1, wherein the application layer 102 represents data (e.g., internet protocol data) arriving from a particular application. More specifically, the AAL 101 stores the application data in the payload portion of one or more ATM cells. The ATM layer 103 then transmits the one or more ATM cells to a receiving point in the network.

There are several well known AALs. Two of the most widely used AALs are AAL1 and AAL5. AAL1 is used for transporting synchronous data (i.e., circuit emulation data). AAL5, on the other hand, is used for transporting packet data, for example, IP packet data.

In networks that employ ATM as a bearer for IP/PPP data packets, AAL5 is the ATM adaption layer used. Since the packet length of each IP/PPP data packet is not typically equivalent to the length of an ATM cell, or more specifically, to the length of an ATM cell payload, the unused portion of the ATM cell payload must be padded after the IP/PPP packet has been inserted therein. As explained above, padding ATM cells or transmitting ATM cells that are not completely filled with data is an extremely inefficient use of bandwidth, and it has the effect of counter-acting any added efficiency achieved by compressing the IP/PPP data packet header. Accordingly, there is a substantial need to provide a more efficient way to transport IP/PPP data packets when using ATM as a bearer.

SUMMARY

It is an object of the present invention to provide a more bandwidth efficient technique for transporting IP/PPP data packets using ATM.

It is yet another objective of the present invention to improve bandwidth efficiency by employing AAL2 for transporting IP/PPP data packets, where AAL2 is better suited for transporting short or variable length data packets.

It is still another objective of the present invention to employ header compression techniques with AAL2 to decrease overhead and further improve bandwidth efficiency.

In accordance with one aspect of the present invention, the foregoing and other objects are achieved by a method for transporting internet protocol data packets in a network environment. The method involves storing a portion of the internet protocol data packet header at a location in a look-up table and then mapping that portion of the internet protocol data packet header by inserting an address into a portion of an AAL2 minicell header, wherein the address corresponds to the look-up table location where the portion of the internet protocol data packet header is stored. The remaining portion of the internet protocol data packet is then inserted into a payload portion of the AAL2 minicell, which in turn, is transmitted to a receiving point in the network. At the receiving point, the address inserted into the AAL2 minicell header is analyzed so that the portion of the internet protocol data packet header that was stored in the look-up table can be retrieved based on the address in the AAL2 minicell header.

In accordance with another aspect of the present invention, the foregoing and other objects are achieved by a method for transporting an internet protocol data packet over an AAL2 connection. This method involves encapsulating the internet protocol data packet using a point-to-point protocol, wherein the internet protocol data packet includes a header portion. The method then determines whether data associated with a data field in the internet protocol data packet header has been previously stored in a look-up table. If the data was previously stored in the look-up table, omitting the data field from the internet protocol data packet header and inserting the address in a data field of an AAL2 minicell header, wherein the address corresponds to the location of the data which was previously stored in the look-up table. The encapsulated internet protocol data packet is then inserted into the payload portion of the AAL2 minicell, which is, in turn, transmitted to a receiving point in the network. At the receiving point, the data associated with the data field in the internet protocol data packet header is retrieved from the look-up table in accordance with the address stored in the data field of the AAL2 minicell header.

In accordance with yet another aspect of the present invention, the foregoing and other objects are achieved by a method for transporting a point-to-point protocol encapsulated, internet protocol data packet over an AAL2 minicell in a network environment. The method first involves determining whether the internet protocol data packet header is in a compressed format, and if the internet protocol data packet header is compressed, then utilizing an address stored in a first portion of the AAL2 minicell header to map data associated with a first data field in the internet protocol data packet header which has been previously stored in a first look-up table. Next, the method determines whether the AAL2 minicell is to be segmented, and if the AAL2 minicell is to be segmented, utilizing an address stored in a second portion of the AAL2 minicell header to map data associated with a second data field in the internet protocol data packet which has been previously stored in a second look-up table. The AAL2 minicell is eventually transmitted to a receiving point in the network, and the data associated with the first data field in the internet protocol data packet header is retrieved from the first look-up table based on the address stored in the first portion of the AAL2 minicell header, and the data associated with the second data field in the internet protocol data packet is retrieved from the second look-up table based on the address stored in the second portion of the AAL2 minicell header.

In accordance with still another aspect of the present invention, the foregoing and other objects are achieved by a method for transporting an internet protocol data packet over an AAL2 connection in a network environment, wherein said internet protocol data packet includes a header portion. Initially, the method determines whether data associated with a session context/connection identifier data field in a header portion of a first internet protocol data packet has been previously stored in a look-up table. If it has not been previously stored in the look-up table, the method inserts the full internet protocol data packet header into a payload portion of a first AAL2 minicell. In addition, an unused look-up table address is inserted into a data field associated with the header portion of the AAL2 minicell. The first AAL2 minicell is then transmitted from a sending point to a receiving point in the network. At the receiving point, the data associated with the session context/connection identifier data field is stored in the look-up table in accordance with the unused address in the data field associated with the AAL2 minicell header. Next, the method determines whether data associated with a session context/connection identifier data field in the header of a second internet protocol data packet has been previously stored in the look-up table. If the data associated with the session context/connection identifier data field in the header of the second internet protocol data packet has been previously stored, then the look-up table address associated with this previously stored data is inserted into a data field in the header portion of a second AAL2 minicell. The remaining portion of the second internet protocol data packet header, excluding the session context/connection identifier data field, is then inserted into a payload portion of the second AAL2 minicell, which is, in turn, transmitted to the receiving point. The data associated with the session context/connection identifier data field in the header of the second internet protocol data packet is then retrieved from the look-up table based on the address stored in the data field of the second AAL2 minicell header.

BRIEF DESCRIPTION OF THE DRAWINGS

The objects and advantages of the invention will be understood by reading the following detailed description in conjunction with the drawings in which.

DETAILED DESCRIPTION

The present invention involves transporting point-to-point protocol (PPP) encapsulated internet protocol (IP) data packets, herein referred to as IP/PPP data packets. There are several different internet protocols known in the art including the real time transmission protocol (RTP), the user datagram protocol (UDP) and the transmission control protocol (TCP). It is well known in the art to utilize ATM, and, more precisely, AAL5 to transport IP/PPP data packets in a network environment.

In general, the present invention employs ATM adaption layer type two (AAL2) minicells for transporting IP/PPP data packets, rather than ATM cells in accordance with AAL5. AAL2 is specifically designed to enhance bandwidth utilization for short packet, low bit rate data. Accordingly, maintaining IP/PPP data packets that are as short as possible is a primary concern in the present invention. Therefore, the present invention takes advantage of existing IP/PPP header compression techniques to reduce undesirable overhead whenever possible. In addition, the present invention maps certain data fields in the IP/PPP data packet header using data fields in the AAL2 minicell header. By mapping information in the IP/PPP data packet header, IP/PPP data packet overhead is further reduced, thereby additionally enhancing bandwidth utilization and transmission efficiency.

Figure 7:
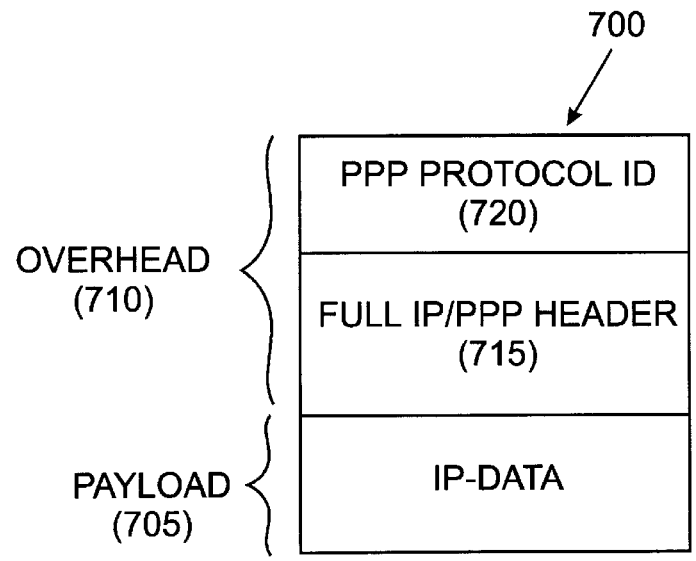
FIG. 7 illustrates an IP/PPP data packet containing a full data packet header in accordance with the prior art.

FIG. 7 illustrates a typical IP/PPP data packet 700. The IP/PPP data packet 700 includes a payload portion 705, containing the IP data, and it includes an overhead portion 710 comprising an IP/PPP data packet header 715 and a PPP protocol identifier (ID) 720. The IP/PPP data packet header 715 illustrated in FIG. 7 is a full, uncompressed header. As such, it may contain 40 or more bytes of information depending on the IP data packet type (e.g., TCP, RTP, UDP), as defined by the PPP protocol ID 720.

Figure 8:
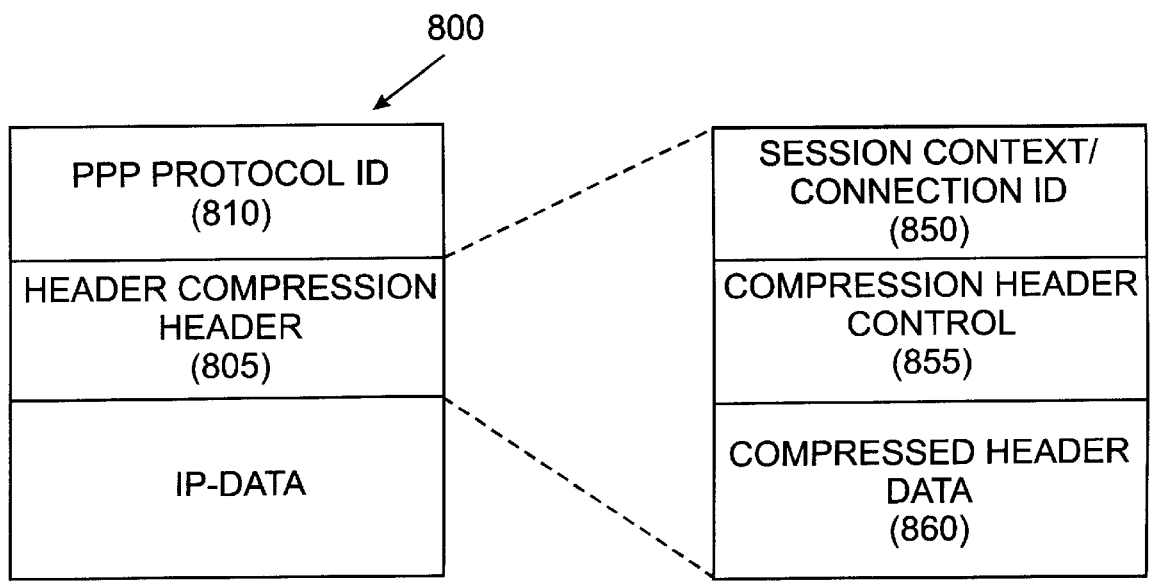
FIG. 8 illustrates an IP/PPP data packet containing a compressed data packet header in accordance with the prior art.

FIG. 8, in contrast, illustrates an IP/PPP data packet 800 that contains a compressed header 805. The specific content of the compressed header 805 depends upon the compression algorithm used to compress the otherwise full header, and the IP data packet type defined by the PPP protocol ID 810. An exemplary compression algorithm for TCP headers is fully described in Jacobson, Compressing TCP/IP Headers for Low-Speed Serial Links, Network Working Group RFC 1144(1990). Another exemplary compression algorithm for UDP and RTP headers is described in Casner et al., Compressing IP/UDP/RTP Headers for Low-Speed Serial Links, Internet Engineering Task Force (1997).

In accordance with a preferred embodiment of the present invention, IP/PPP data packets associated with one or more sessions, whether or not they contain a compressed header, are inserted into the payload portion of AAL2 minicells. The AAL2 minicells are then transmitted from a sending point within the network to a receiving point within the network.

FIG. 8 also illustrates the data fields that typically comprise a compressed IP/PPP data packet header, for example, IP/PPP data packet header 805. The data fields include a session context or connection identifier (ID) 850, herein referred to as a session context/connection ID. Whether this data field pertains to a session or a connection depends upon whether the encapsulated IP data packet is a UDP/RTP data packet or a TCP data packet. The session context/connection ID 850 contains source/destination or connection/flow information, as one skilled in the art will readily understand, wherein the source/destination/connection/flow information for each IP/PPP data packet associated with a given session/connection is the same. Another data field is the compression header control 855. This data field generally includes a data packet sequence count which changes from one IP/PPP data packet to the next by a constant amount (i.e., a first order change) and a bit mask to identify the contents of the compressed header data field 860.

Figure 3:
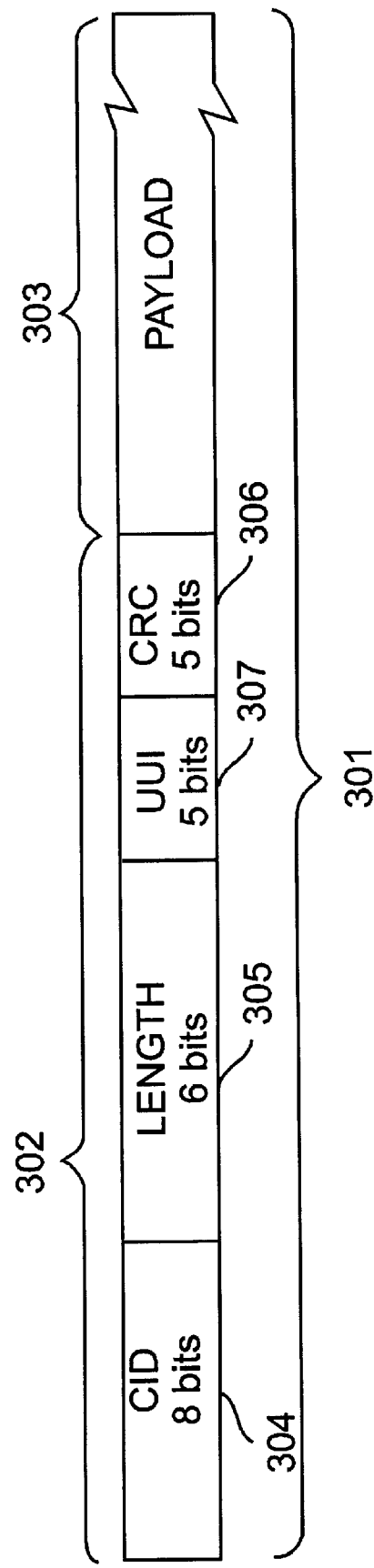
FIG. 3 shows the protocol for a typical AAL2 minicell in accordance with the prior art.
Figure 4:
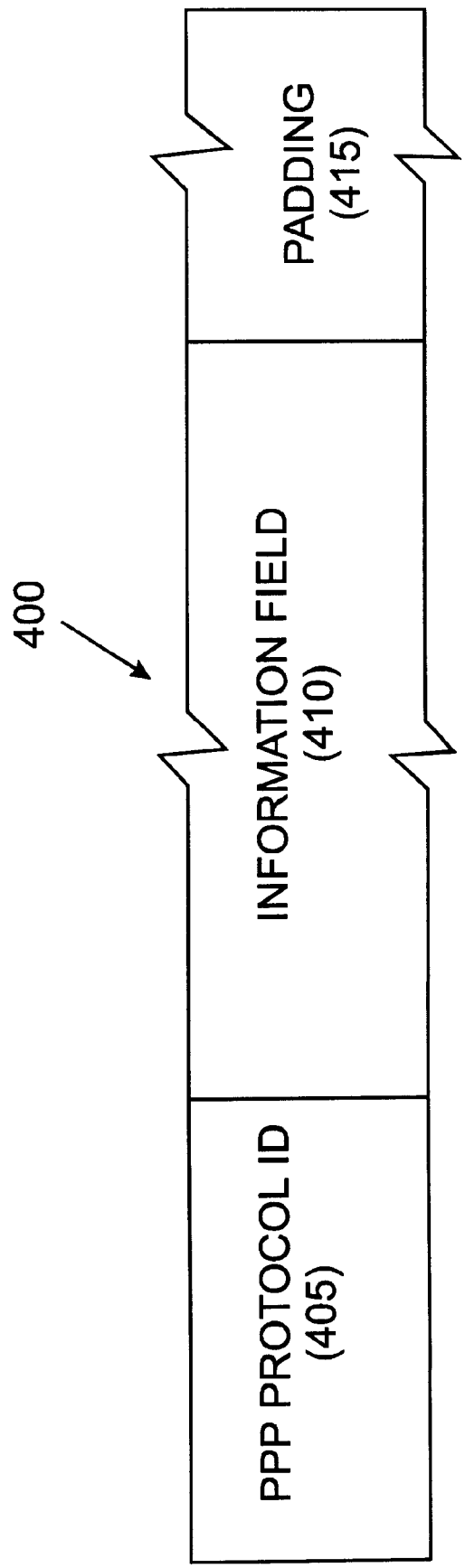
FIG. 4 illustrates the IP/PPP data packet encapsulation model in accordance with the prior art.
Figure 5:
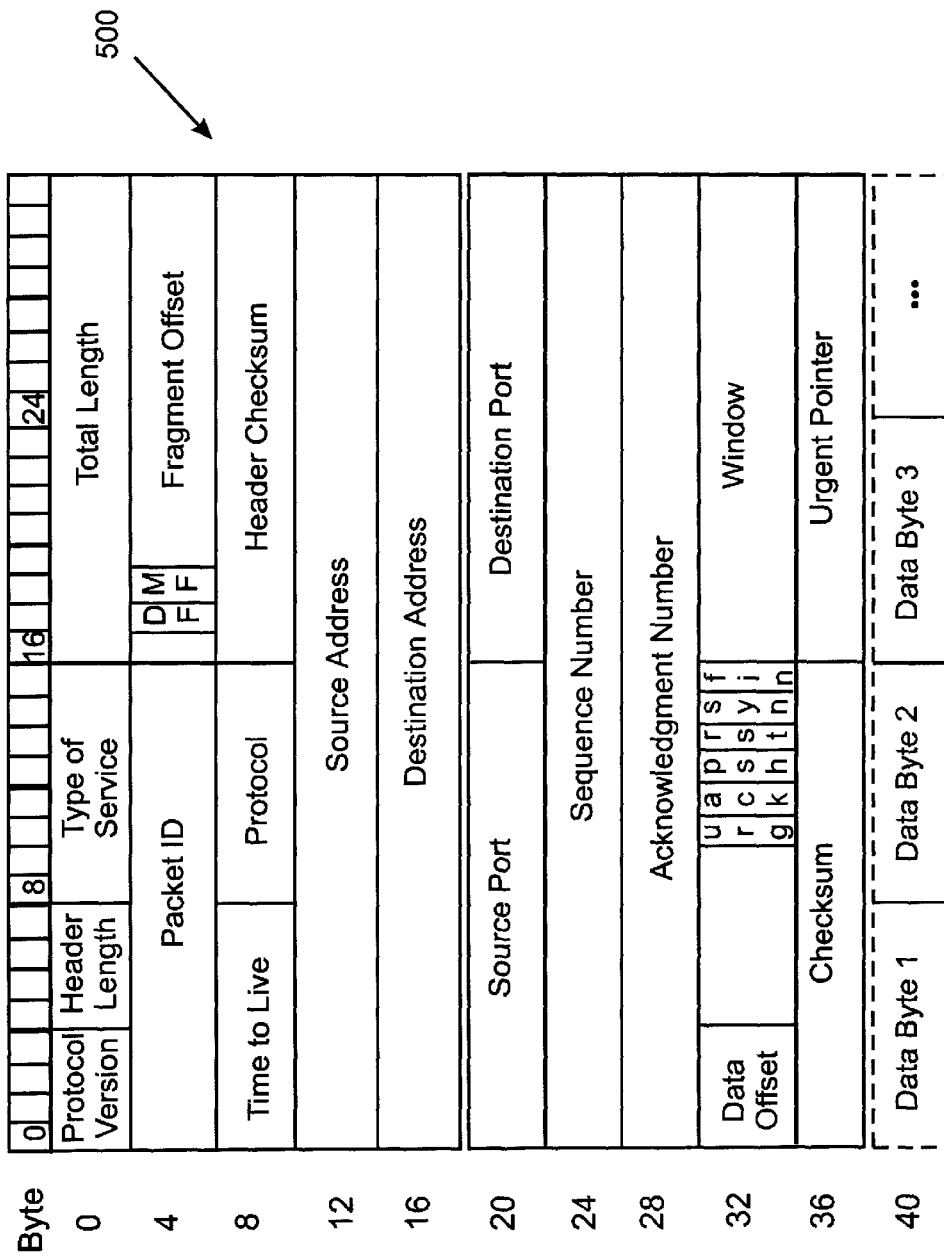
FIG. 5 is an exemplary IP data packet header in accordance with the prior art.
Figure 6:
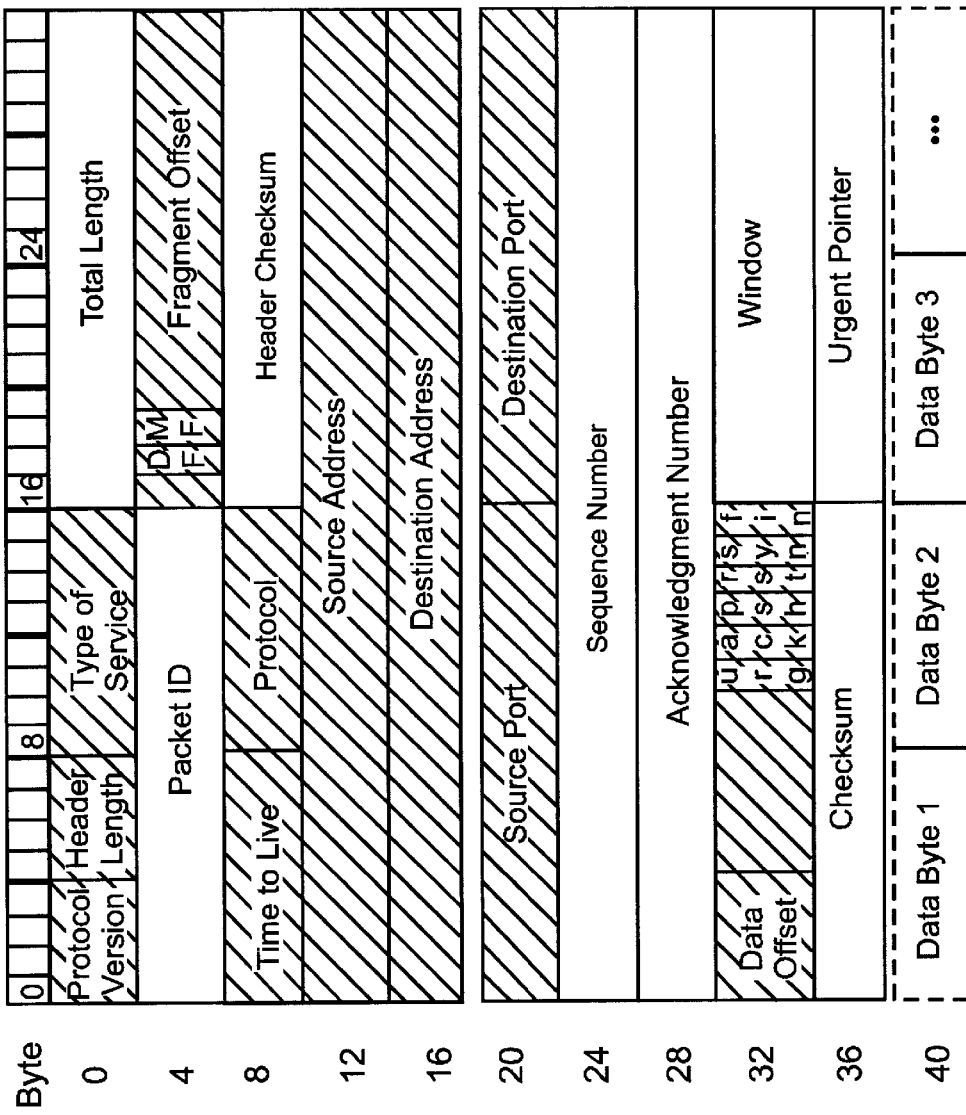
FIG. 6 is an exemplary IP data packet header in accordance with the prior art.

In accordance with the preferred embodiment of the present invention, certain data fields in the AAL2 minicell header, as illustrated in FIG. 3, may be used for mapping the PPP protocol ID 810 and the session context/connection ID 850. More particularly, the PPP protocol ID 810 may be mapped to the user-to-user information (UUI) field, while the session context/connection ID may be mapped to the channel identification (CID) field 304. Consequently, the source/destination/connection/flow information associated with the session context/connection ID 850 need not be transmitted with each and every IP/PPP data packet associated with the corresponding session/connection as part of the IP/PPP data packet header. Likewise, the PPP protocol ID 810 information need not be transmitted with each IP/PPP data packet associated with the session/connection. By mapping the session context/connection ID 850 and PPP protocol ID 810 information to the CID 304 and UUI 307 fields respectively, rather than retransmit them with each IP/PPP data packet as part of a compressed IP/PPP data packet header, overhead is significantly reduced. This is especially the case where tens if not hundreds of IP/PPP data packets are to be transmitted over the life of the session/connection.

Further in accordance with the preferred embodiment of the present invention, mapping the session context/connection ID 850 to the CID field 304 may be implemented with a look-up table maintained in or associated with the header decompressor at the receiving point. For example, each CID code combination may define a particular entry/address in the look-up table. If the source/destination/connection/flow information associated with the session context/connection ID 850 has been previously stored in the look-up table, the compression algorithm, in the compressor located at the sending point, need only copy the corresponding address, or a subportion thereof, into the CID field 304 of the AAL2 minicell header before the AAL2 minicell is transmitted from the sending point to the receiving point. At the receiving point, the decompression algorithm analyzes the CID field 304 and retrieves the source/destination/connection/flow information from the look-up table by accessing the look-up table in accordance with the address stored in the CID field 304.

If the source/destination/connection/flow information has not been previously stored in the look-up table, e.g., the corresponding IP/PPP data packet is the first of a series of IP/PPP data packets associated with a given session/connection, the compression algorithm identifies an unused entry in the look-up table. The compression algorithm then inserts the address of the unused look-up table entry in the CID data field 304 of the corresponding AAL2 minicell. A full header containing the source/destination/connection/ flow information associated with the session context/ connection ID 850 is inserted, in its entirety, into the payload of the AAL2 minicell and then transferred to the receiving point. The decompression algorithm recognizes that this IP/PPP data packet is initiating a new session/connection. Accordingly, the decompression algorithm then stores the previously unstored source/destination/connection/flow information in the lookup table based on the address that the compression algorithm stored in the CID field 304. Subsequently transmitted IP/PPP data packets associated with the same session/connection need only carry the look-up table address in the CID field 304 of the corresponding AAL2 minicell header, rather than the source/destination/ connection/flow information.

If the IP/PPP data packets associated with a given session/ connection contain uncompressed headers, there is no need to store source/destination/connection/flow information in the look-up table. Accordingly, the compression algorithm may store a default code in the CID field 304. The default code permits the decompression algorithm to recognize the IP/PPP data packet as a data packet containing a full, uncompressed IP/PPP data packet header.

Conventionally, the CID field 304 is 8 bits in length. Therefore, the CID field 304 can map 256 different entries in the look-up table. Hence, 256 different sessions/ connections can be multiplexed onto a single AAL2 link. It is possible, however, to employ two or more parallel AAL2 links, each containing an 8 bit CID field. Accordingly, two 8 bit CID fields can map 64 K (i.e., 65,536) different entries in a look-up table. Therefore, 64 K different sessions/ connections could be multiplexed over two parallel AAL2 links. It is also possible to employ two or more parallel AAL2 links, wherein the 8 bit CID codes reflect a lower, or least significant address byte, while the virtual channel connection (VCC) code combined with the virtual path indicator (VPI) code in the ATM cell header reflect an upper, or most significant address byte. In this case, at least 64 K different sessions/connections could be multiplexed over 256 parallel AAL2 links.

In accordance with the preferred embodiment of the present invention, mapping the PPP protocol ID 810 to the UUI field 307 of the corresponding AAL2 minicell header is implemented in a similar manner as the session context/ connection ID 850 described above. Thus, if the PPP protocol ID 810 has been previously transported and stored in a UUI look-up table maintained in or associated with the decompressor at the receiving point the compressor algorithm need only copy the corresponding address of the UUI look-up table into the UUI field 307 of the AAL2 minicell header before the AAL2 minicell is transmitted from the sending point to the receiving point. At the receiving point, the decompression algorithm analyzes the UUI field 307. The UUI look-up table address stored in the UUI field 307 is then used to retrieve the PPP protocol ID 810 stored in the UUI look-up table.

If the PPP protocol ID 810 has not been previously stored in the UUI look-up table, a new UUI code may be inserted into the UUI field 307 of the AAL2 minicell header, and the PPP protocol ID 810 is transported in its entirety to the receiving point. The decompression algorithm may then store the previously unstored PPP protocol ID 810 in the UUI look-up table in accordance with the address that the compression algorithm stored in the UUI field 307. Therefore, subsequently transmitted IP/PPP data packets sharing the same PPP protocol ID 810 need only contain the appropriate UUI look-up table address.

Figure 1:
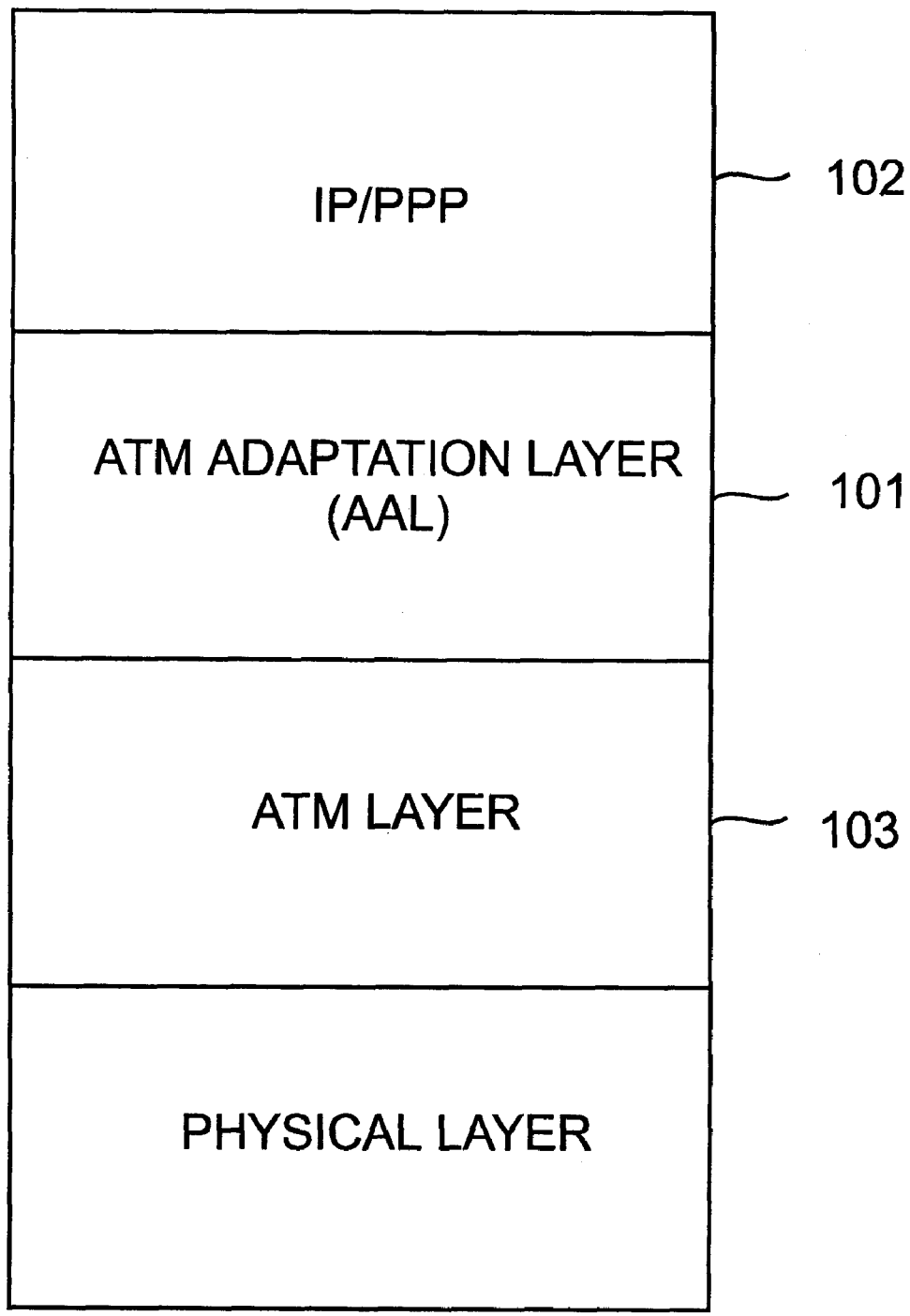
FIG. 1 illustrates the relationship between an ATM adaption layer and both the application layer and the ATM layer, in accordance with the prior art.
Figure 2:
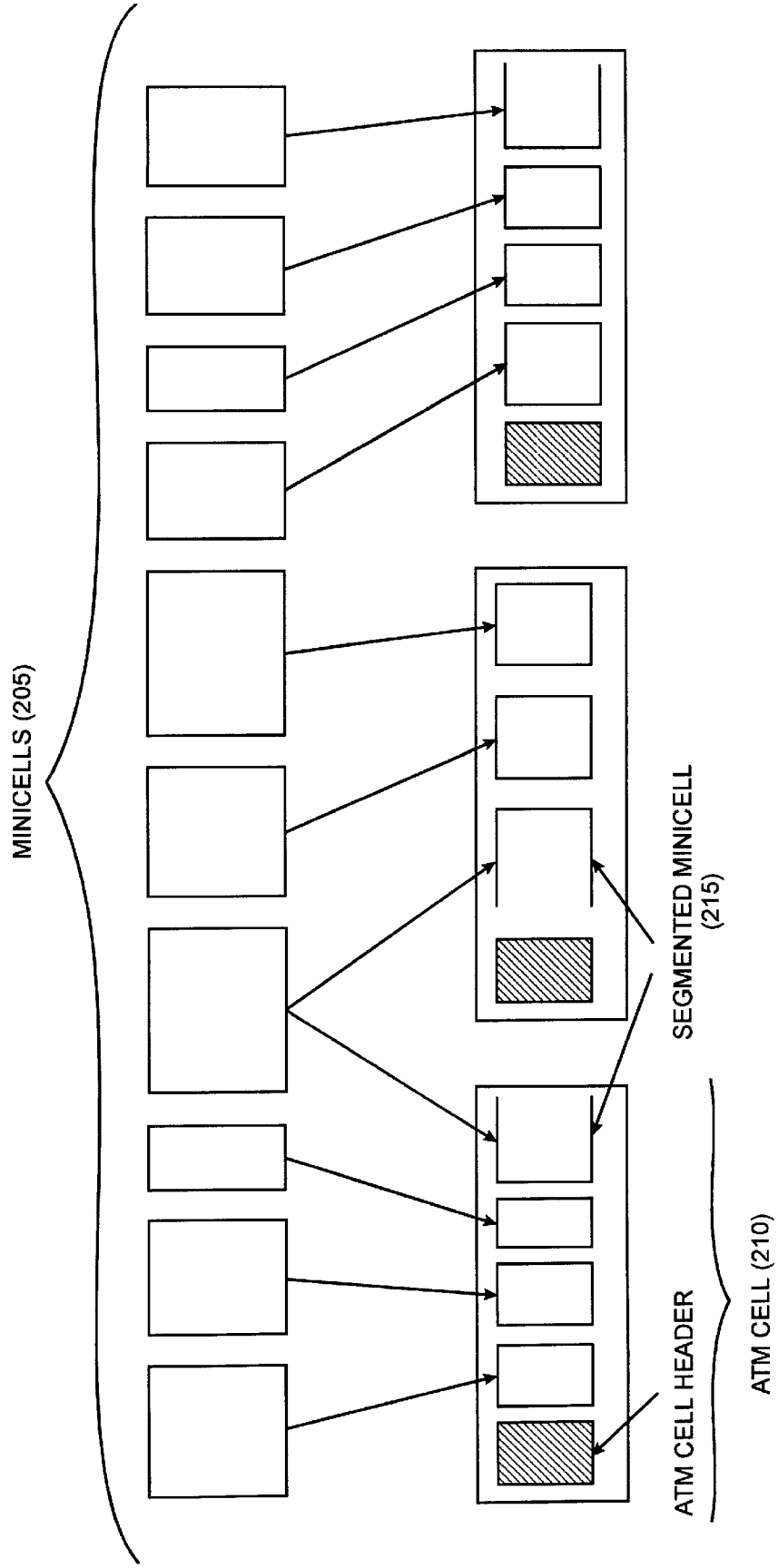
FIG. 2 illustrates the AAL2 process in accordance with the prior art.

As one skilled in the art will readily appreciate, the UUI field 307 generally contains information that is used when the length of the AAL2 minicell exceeds the space that is available in a current ATM cell payload. See, for example, segmented minicell 215 in FIG. 2. If it is necessary to segment the minicell, the UUI field 307 is not available to map the PPP protocol ID 810 as described above. It is, therefore, one aspect of the present invention that the PPP protocol ID 810 be transmitted in its entirety as part of the IP/PPP data packet header, and not mapped to the UUI field 307, if the corresponding minicell is to be segmented. Segmentation, however, does not affect the mapping of the session context/connection ID 850 to the CID field 304. Accordingly, overhead can still be reduced even if the minicell is to be segmented.

Figure 9:
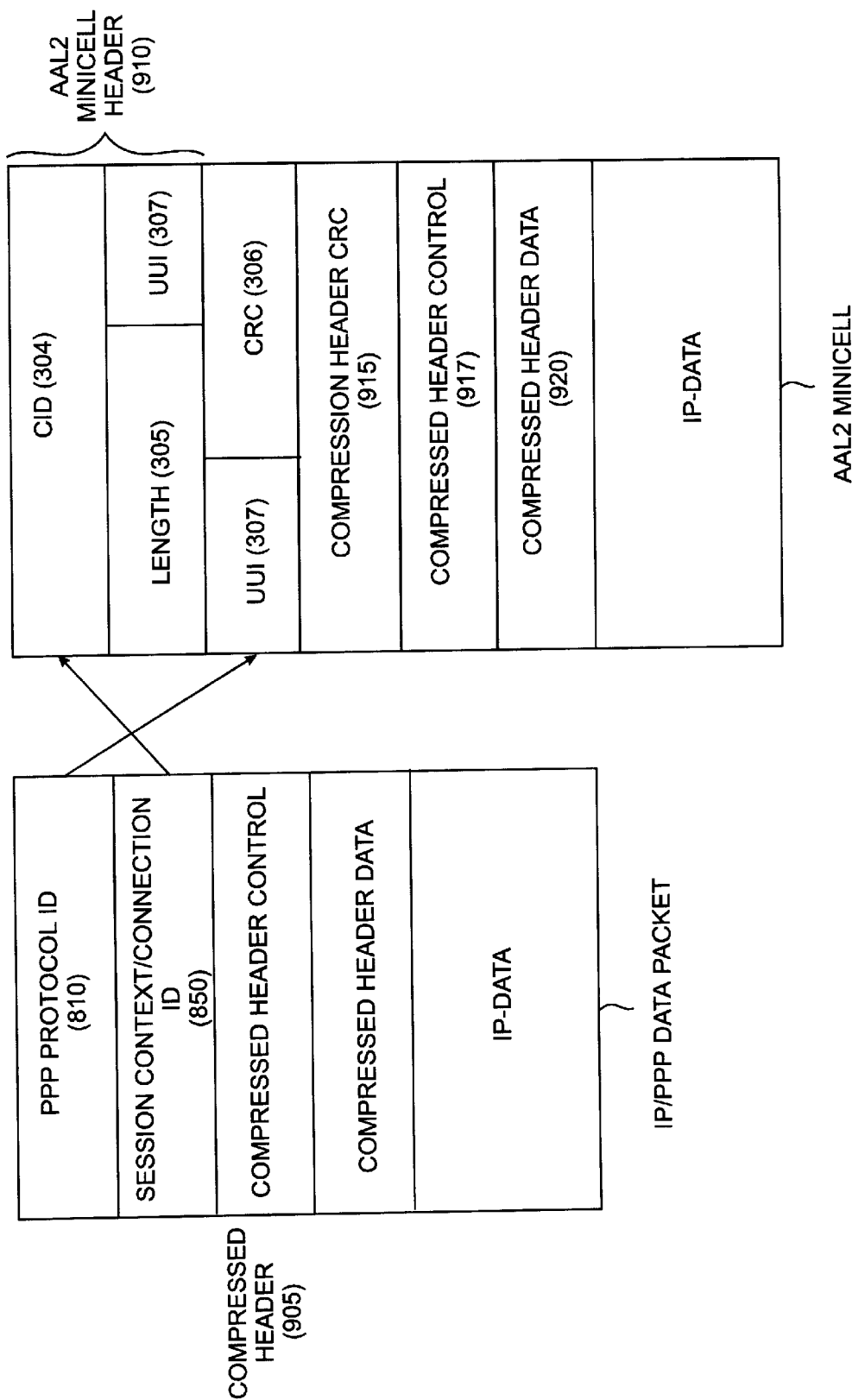
FIG. 9 illustrates the mapping feature of the present invention.
Figure 10:
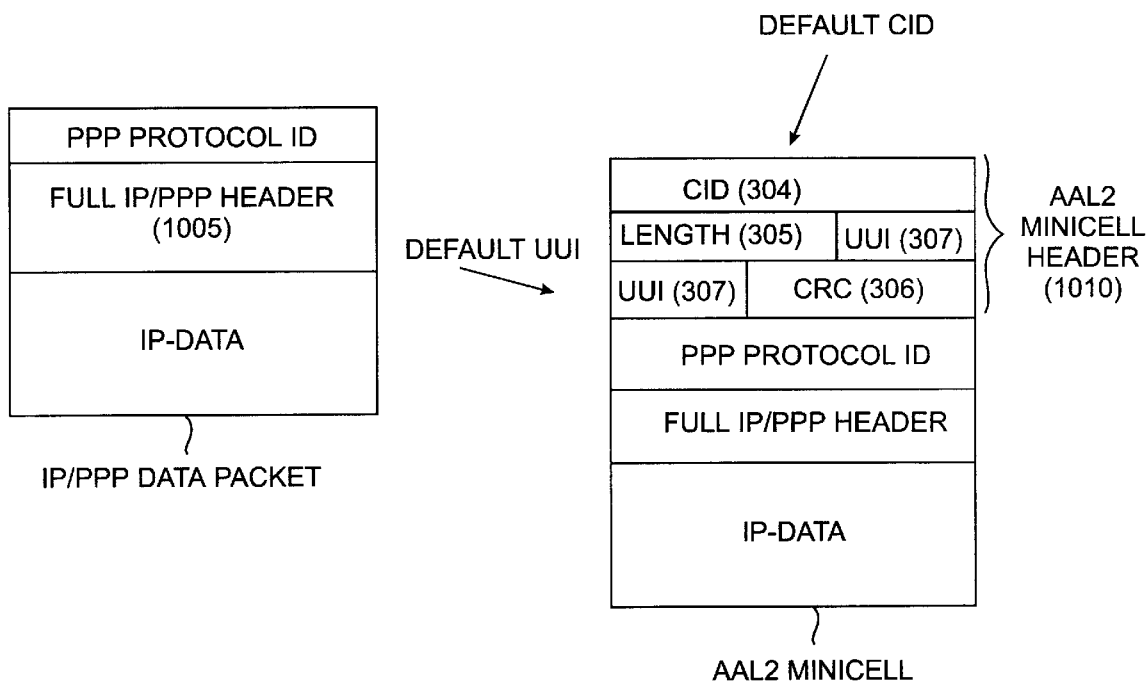
FIG. 10 illustrates the insertion of default CID codes in accordance with the present invention.

FIG. 9 illustrates that in accordance with the preferred embodiment of the present invention, the session context/ connection ID 850 in a compressed IP/PPP data packet header 905 may be mapped to the CID field 304 in the AAL2 minicell header 910, as explained above. FIG. 9 also shows that under ordinary circumstances, the PPP protocol ID 810 may be mapped to the UUI field 307 of the AAL2 minicell header 910, as explained above. However, if the IP/PPP data packet header, for example, IP/PPP data packet header 1005, is not compressed, as illustrated in FIG. 10, default codes may be stored in both the CID and UUI fields of the corresponding minicell header 1010.

In accordance with an alternative embodiment, a compression header cyclic redundancy code (CRC) 915 may be included as part of the IP/PPP data packet header when the session context/connection ID 850 is mapped to the CID field 304 as illustrated in FIG. 9. The addition of the compression header CRC 915 provides fault protection for the compressed header data 920 from transmission errors. However, the inclusion of the compression header CRC 915 does take up overhead. Accordingly, the compression header CRC 915 is optional, and can be selected by executing an appropriate configuration command.

Figure 11:
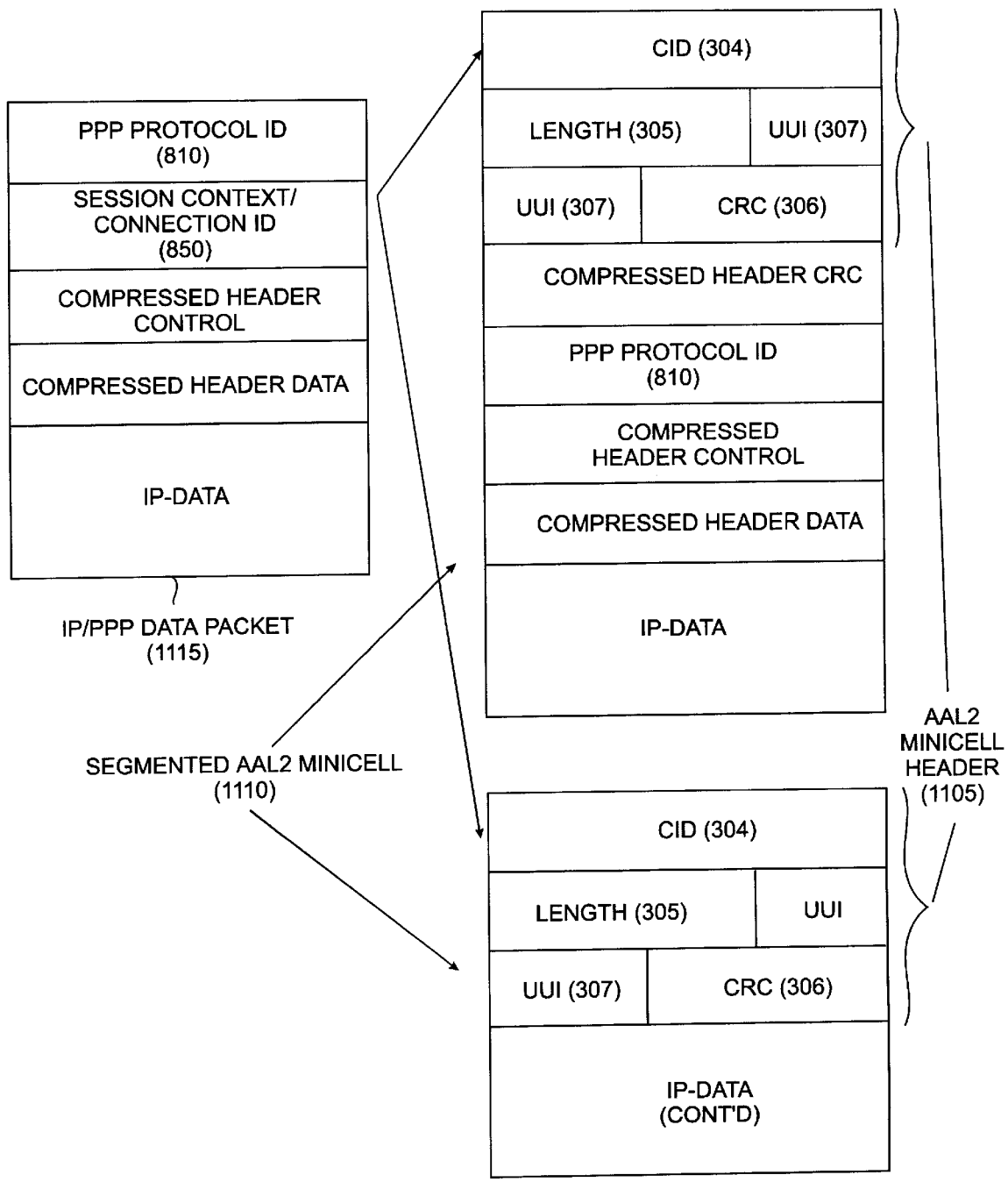
FIG. 11 illustrates the mapping feature of the present invention when the AAL2 minicell is to be segmented.

FIG. 11 illustrates that when minicell segmentation is required, only the session context/connection ID 850 may be mapped to the CID field 304 of the segmented AAL2 minicell header 1105 as described above. The PPP protocol ID 810 is not mapped to the UUI field 307, and must be transmitted in its entirety as shown because the UUI field 307 is needed to help define the segmentation of the AAL2 minicell 1110.

In accordance with another alternative embodiment of the present invention, mapping can be extended to a portion of the compressed header control data field 855 using the same approach as described above. As there are only a few PPP protocol ID types, the UUI data field 307 may be used to map the masking bits and sequence count fields associated with the compressed header control data field 855.

The present invention has been described with reference to several exemplary embodiments. However, it will be readily apparent to those skilled in the art that it is possible to embody the invention in specific forms other than those of the exemplary embodiments described above.

This may be done without departing from the spirit of the invention. These exemplary embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method for transporting internet protocol data packets in a network environment, wherein said internet protocol data packets include a header portion, said method comprising the steps of:

storing a portion of the internet protocol data packet header at a location in a look-up table;

mapping the portion of the internet protocol data packet header stored in the look-up table by inserting an address into a portion of an AAL2 minicell header, wherein the address corresponds to the look-up table location where the portion of the internet protocol data packet header is stored;

inserting a remaining portion of the internet protocol data packet header into a payload portion of the AAL2 minicell;

transmitting the AAL2 minicell to a receiving point in the network;

analyzing the address inserted into the AAL2 minicell header;

retrieving the portion of the internet protocol data packet header stored in the look-up table based on the address in the AAL2 minicell header.

2. The method of claim 1, wherein the portion of the internet protocol data packet stored in the look-up table is a session context/connection identifier.

3. The method of claim 1, wherein the portion of the AAL2 minicell header where the look-up table address is stored is a channel identification data field.

4. A method for transporting an internet protocol data packet over an AAL2 connection comprising the steps of:

encapsulating the internet protocol data packet using a point-to-point protocol, wherein the internet protocol data packet includes a header portion;

determining whether data associated with a first data field in the internet protocol data packet header has been previously stored in a first look-up table;

if the data associated with the first data field in the internet protocol data packet header has been previously stored in the first look-up table, omitting the first data field from the internet protocol data packet header and inserting an address in a first data field of an AAL2 minicell header, wherein the address corresponds to a location in the first look-up table where the data associated with the first data field in the internet protocol data packet header was stored;

inserting the encapsulated internet protocol data packet into a payload portion of the AAL2 minicell;

transmitting the AAL2 minicell to a receiving point in the network; and retrieving the data associated with the first data field in the internet protocol data packet header from the first look-up table in accordance with the address stored in the first data field of the AAL2 minicell header.

5. The method of claim 4 further comprising the steps of:

determining whether the AAL2 minicell is to be segmented.

6. The method of claim 4 further comprising the steps of:

if the AAL2 minicell is not to be segmented, omitting a second data field from the internet protocol data packet, and inserting an address in a second data field of the AAL2 minicell header, wherein the address stored in the second data field of the AAL2 minicell header corresponds to a location in a second look-up table where data associated with the second data field in the internet protocol data packet is stored; and at the receiving point, retrieving the data associated with the second data field in the internet protocol data packet from the second look-up table in accordance with the address stored in the second data field of the AAL2 minicell header.

7. The method of claim 6, wherein the second data field in the internet protocol data packet is a point-to-point protocol identifier data field.

8. The method of claim 6, wherein the second data field of the AAL2 minicell header is a user-to-user information data field.

9. The method of claim 4, wherein the first data field in the internet protocol data packet header is a session context/connection identifier data field.

10. The method of claim 9, wherein the data associated with the session context/connection identifier data field is data packet routing information.

11. A method for transporting a point-to-point protocol encapsulated, internet protocol data packet over an AAL2 minicell in a network environment, wherein the internet protocol data packet includes a header portion, said method comprising the steps of:

determining whether the internet protocol data packet header is in a compressed format;

if the internet protocol data packet header is compressed, utilizing an address stored in a first portion of the AAL2 minicell header to map data associated with a first data field in the internet protocol data packet header which has been previously stored in a first look-up table;

determining whether the AAL2 minicell is to be segmented;

if the AAL2 minicell is to be segmented, utilizing an address stored in a second portion of the AAL2 minicell header to map data associated with a second data field in the internet protocol data packet which has been previously stored in a second look-up table;

transporting the AAL2 minicell to a receiving point in the network; and retrieving the data associated with the first data field in the internet protocol data packet header from the first look-up table based on the address stored in the first portion of the AAL2 minicell header, and the data associated with the second data field in the internet protocol data packet from the second look-up table based on the address stored in the second portion of the AAL2 minicell header.

12. The method of claim 11, wherein the internet protocol data packet is a transmission control protocol (TCP) data packet.

13. The method of claim 11, wherein the internet protocol data packet is a user datagram protocol (UDP) data packet.

14. The method of claim 11, wherein the internet protocol data packet is a real-time transmission protocol (RTP) data packet.

15. The method of claim 11, wherein the data associated with a first field in the internet protocol data packet header is data packet routing information.

16. The method of claim 15, wherein the first data field in the internet protocol data packet is a session context/connection identifier data field.

17. The method of claim 11, wherein the data associated with the second data field in the internet protocol data packet is internet protocol type data.

18. A method for transporting an internet protocol data packet over an AAL2 connection in a network environment, wherein said internet protocol data packet includes a header portion, said method comprising the steps of:

determining whether data associated with a session context/connection identifier data field in a header portion of a first internet protocol data packet has been previously stored in a look-up table;

if the data associated with the session context/connection identifier data field has not been previously stored in the look-up table, inserting the internet protocol data packet header into a payload portion of a first AAL2 minicell, wherein the internet protocol data packet header is a full header;

inserting an unused look-up table address in a data field associated with the header portion of the AAL2 minicell;

transmitting the first AAL2 minicell from a sending point to a receiving point in the network;

storing the data associated with the session context/connection identifier data field in the look-up table in accordance with the unused address in the data field associated with the AAL2 minicell header;

determining whether data associated with a session context/connection identifier data field in the header of a second internet protocol data packet has been previously stored in the look-up table;

if the data associated with the session context/connection identifier data field in the header of the second internet protocol data packet has been previously stored, storing an address in a data field associated with a header portion of a second AAL2 minicell, wherein the address corresponds to a location in the first look-up table where the data associated with the session context/connection identifier field has been previously stored;

inserting a remaining portion of the second internet protocol data packet header, excluding the session context/connection identifier data field, into a payload portion of the second AAL2 minicell;

transmitting the second AAL2 minicell to the receiving point; and retrieving the data associated with the session context/connection identifier data field in the header of the second internet protocol data packet based on the address stored in the data field of the second AAL2 minicell header.

19. The method of claim 18, wherein the data field in the first and the second minicell header is a connection identification (CID) data field.

20. The method of claim 18 further comprising the step of:

inserting a default code into the data field of the first AAL2 minicell header, if the data associated with the session context/connection identifier field in the header portion of said first internet protocol data packet has not been previously stored in the look-up table.

* * * * *